H. D. ODEGARD.
TUG HOOK.
APPLICATION FILED JULY 2, 1910.
981,105.
Patented Jan. 10, 1911.
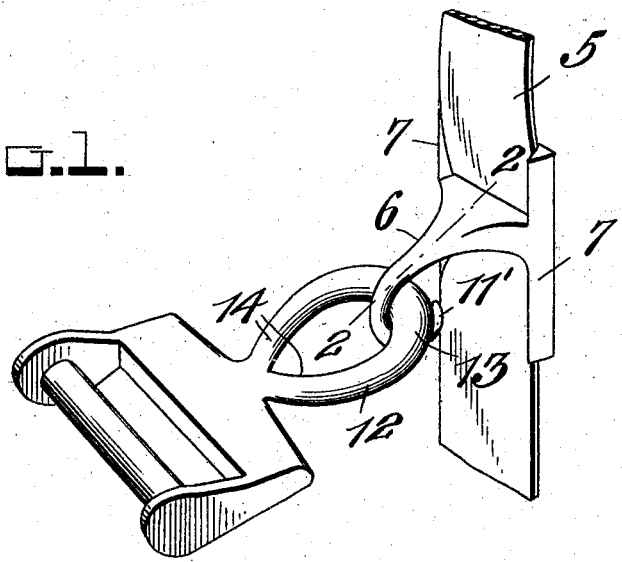
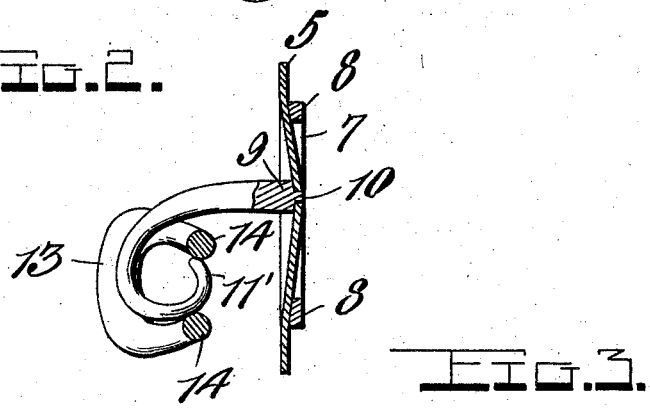
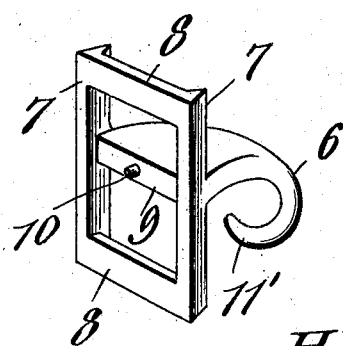
Witnesses
Chas. L. Grienbauer.
H. S. McQuay
Inventor
H. D. Odegard,
By Watson E. Coleman,
Attorney

UNITED STATES PATENT OFFICE.

HANS D. ODEGARD, OF DRAKE, NORTH DAKOTA.

TUG-HOOK.

981,105.  Specification of Letters Patent.  Patented Jan. 10, 1911.

Application filed July 2, 1910. Serial No. 570,143.

*To all whom it may concern:*

Be it known that I, HANS D. ODEGARD, a citizen of the United States, residing at Drake, in the county of McHenry and State of North Dakota, have invented certain new and useful Improvements in Tug-Hooks, of which the following is a specification, reference being had to the accompanying drawings.

This invention relates to an improved tug hook and has for its object to provide a very simple and efficient device of this character whereby the tugs may be very quickly and securely connected to the hip strap of the harness.

A further object resides in the provision of a harness hook of the above character which is of such construction that all liability of the driving reins catching in the hook is eliminated.

A still further object is to provide a hook which is simple and inexpensive in construction and which will prevent accidental release of the loop or cock-eye therefrom fixed to the end of the tug strap.

With these and other objects in view, the invention consists of the novel features of construction and the combination and arrangement of parts hereinafter fully described and claimed, and illustrated in the accompanying drawings, in which—

Figure 1 is a perspective view of a tug hook, the tug being shown and connected thereto; Fig. 2 is a detail section taken on the line 2—2 of Fig. 1, the cock-eye on the tug being shown in position for releasing the same from the hook; and Fig. 3 is a detail perspective view of the hook detached from the hip strap.

Referring more particularly to the drawings, 5 indicates a section of the hip strap. Upon the hip strap my improved tug hook 6 is secured. This hook consists of a substantially rectangular strap receiving body portion comprising the longitudinal bars 7 and the cross bars 8. An intermediate bar 9 connects the longitudinal bars and has a stud 10 formed thereon for engagement in any one of a series of holes punched in the hip strap. This buckle frame is integrally formed or cast in one piece and the tug hook 6 is formed upon the intermediate cross bar 9 and extends oppositely to the stud 10. When in position upon the hip strap, the bill of this hook extends downwardly and has its end bent upwardly, as shown at 11′.

A cock-eye 12 is secured to the tug hook 6 and the intermediate portion 13 of the loop of the cock-eye is of considerably greater area than the end portions 14. This intermediate portion 13 is of sufficient thickness to prevent the insertion of the loop into the hook at this point, thereby necessitating the turning of the loop in a lateral position with relation to the hook so that the thinner portion 14 thereof may be disposed between the end 11′ of the hook and the shank thereof adjacent to its point of connection to the cross bar 9. After thus positioning the cock-eye and inserting the same into the hook, it will be obvious that owing to the turning of the loop in the bill of the hook whereby the intermediate portion thereof is engaged with the upturned end, the accidental release of the tug from the hook is effectually prevented, it being impossible for the loop of the cock-eye to move between the hook and its shank at this point.

In the use of my improved tug hook, it will be obvious that as the hook is downwardly disposed, all liability of the reins catching in the same is eliminated. When the horse is unharnessed the tug remains connected with the hook, there being no necessity for disconnecting these parts. The horse may be thus quickly harnessed to the vehicle or removed therefrom.

From the foregoing it will be seen that I have devised a very simple and efficient tug hook whereby the tugs may be easily and quickly connected to the hip strap and their accidental disconnection prevented. The device may be produced at an extremely low cost and in view of its one-piece construction, it will be obvious that the same is extremely durable in practical use. The hook may be made out of any desirable metal and while I have shown the buckle frame of rectangular form, it will be understood that any desired form of this frame may be utilized.

Having thus described the invention what is claimed is:

A tug hook comprising a rectangular buckle frame having an intermediate bar and a stud formed thereon for engagement with the strap, a hook integrally formed with said intermediate bar and extending downwardly therefrom, the bill of said hook being upturned at its extremity and spaced from the hook shank, in combination with a connecting loop carried by the tug strap, said loop being insertible into the hook of the shank at certain points only and nonremovable therefrom at all other points.

In testimony whereof I hereunto affix my signature in the presence of two witnesses.

HANS D. ODEGARD.

Witnesses:
J. H. MILLER,
H. PAULSON.